(12) United States Patent
Ueno

(10) Patent No.: US 6,634,842 B2
(45) Date of Patent: Oct. 21, 2003

(54) CRIME PREVENTION SCREW, EMBEDDING MATERIAL OF SCREW HEAD, SCREW-USE CRIME PREVENTION SEAT AND CRIME PREVENTION SCREW SET

(76) Inventor: Mamoru Ueno, Imazu 362, Kinosaki-cho, Kinosaki-gun, Hyogo-ken (JP)

( * ) Notice: Subject to any disclaimer, the term of this patent is extended or adjusted under 35 U.S.C. 154(b) by 0 days.

(21) Appl. No.: 10/072,946
(22) Filed: Feb. 12, 2002

(65) Prior Publication Data
US 2003/0053886 A1 Mar. 20, 2003

(30) Foreign Application Priority Data
Sep. 19, 2001 (JP) ......................................... 2001-284476

(51) Int. Cl.$^7$ ............................. F16B 37/14; F16B 41/00
(52) U.S. Cl. ..................... 411/377; 411/372.6; 411/375; 411/910
(58) Field of Search ............................. 411/372.6, 373, 411/375, 377, 908, 910

(56) References Cited

U.S. PATENT DOCUMENTS

| 3,065,662 | A | * | 11/1962 | Spoehr et al. | |
| 5,950,777 | A | * | 9/1999 | Stafford | 411/377 X |
| 6,302,630 | B1 | * | 10/2001 | Grant | 411/377 X |

* cited by examiner

*Primary Examiner*—Neill Wilson
(74) *Attorney, Agent, or Firm*—Ronald E. Greigg

(57) ABSTRACT

A crime preventing screw having a recessed portion for receiving the end of a driving tool. The recessed portion is formed with a recessed engagement portion at a partial lace of an inner wall. An embedding material for embedding in the recessed portion of the screw has a shape and size such that it can be buckled in and can be embedded in the recessed portion.

19 Claims, 9 Drawing Sheets

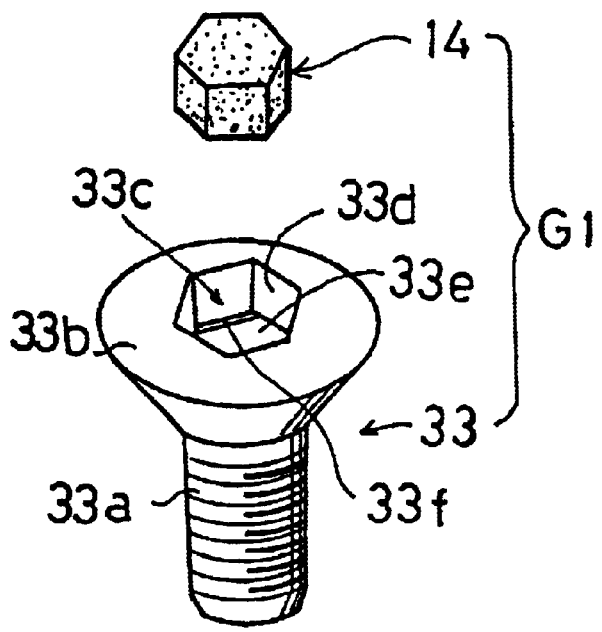
FIG. 5
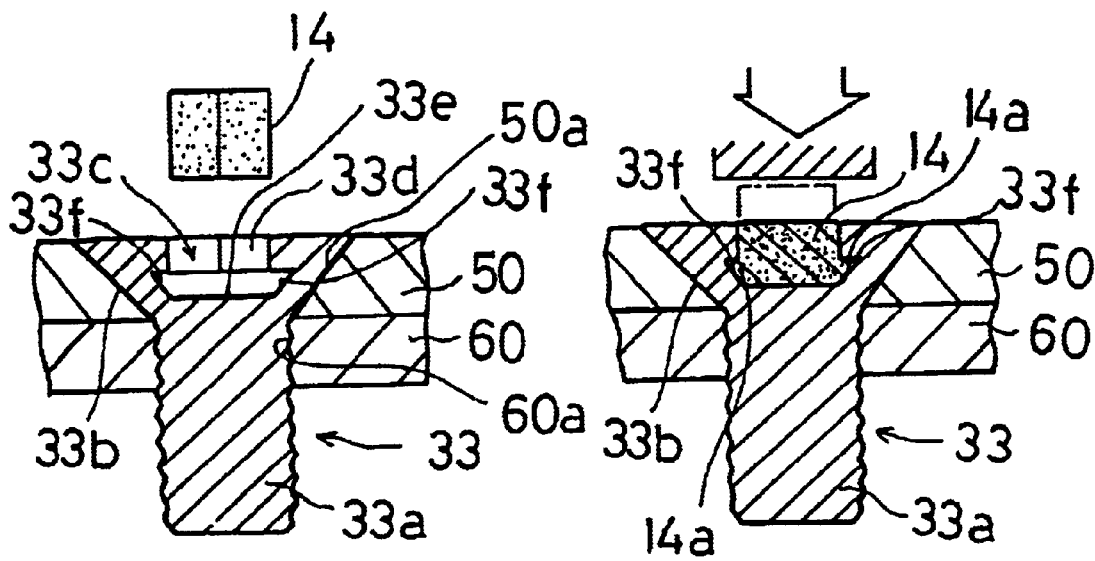
FIG. 6(a)   FIG. 6(b)

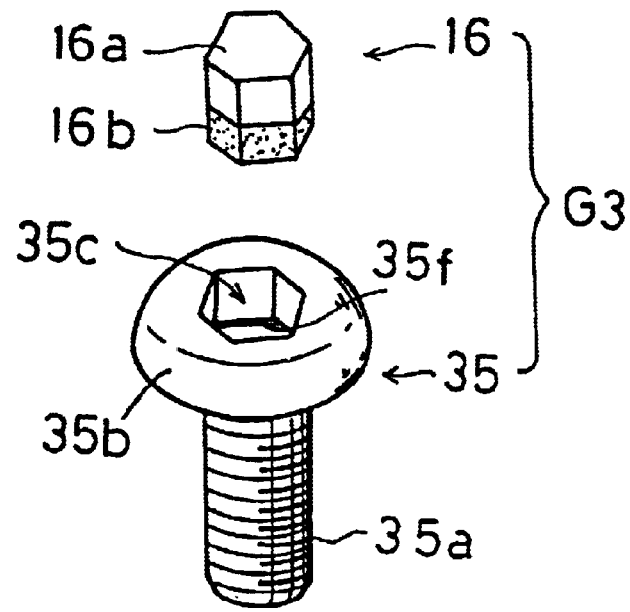
FIG. 9
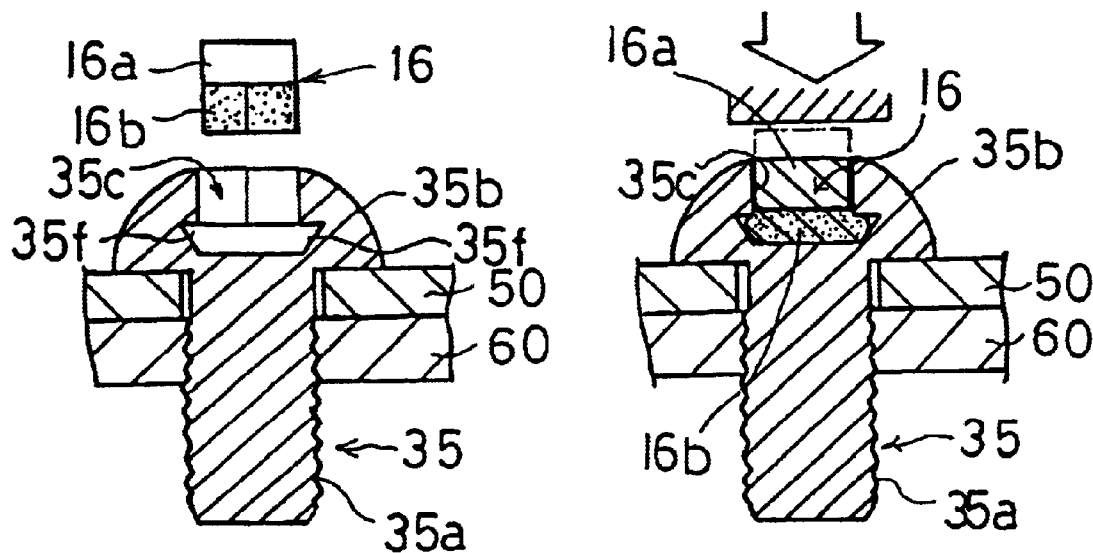
FIG. 10(a)  FIG. 10(b)

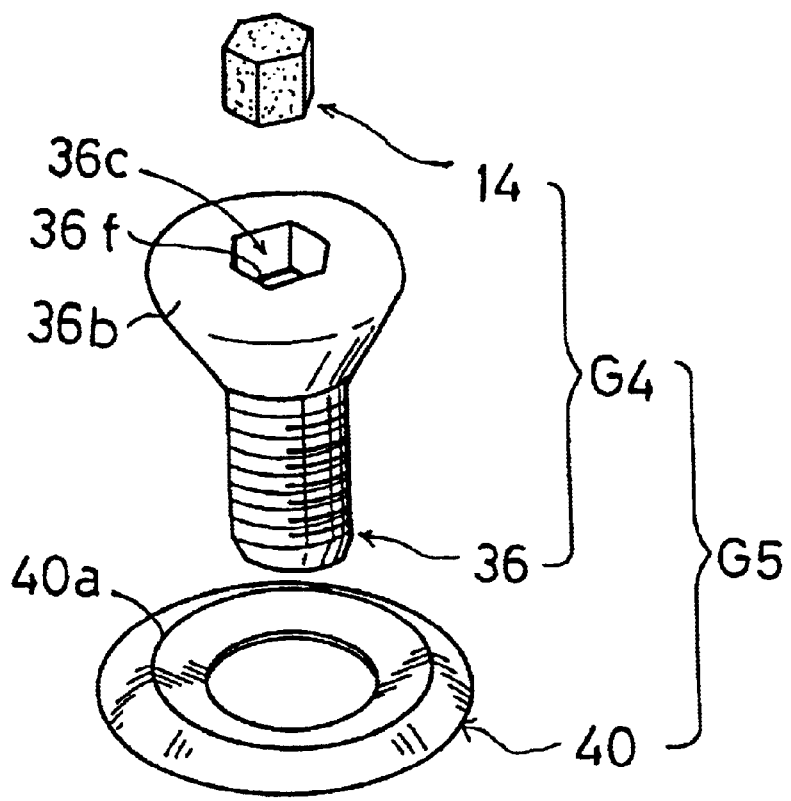
FIG. 11
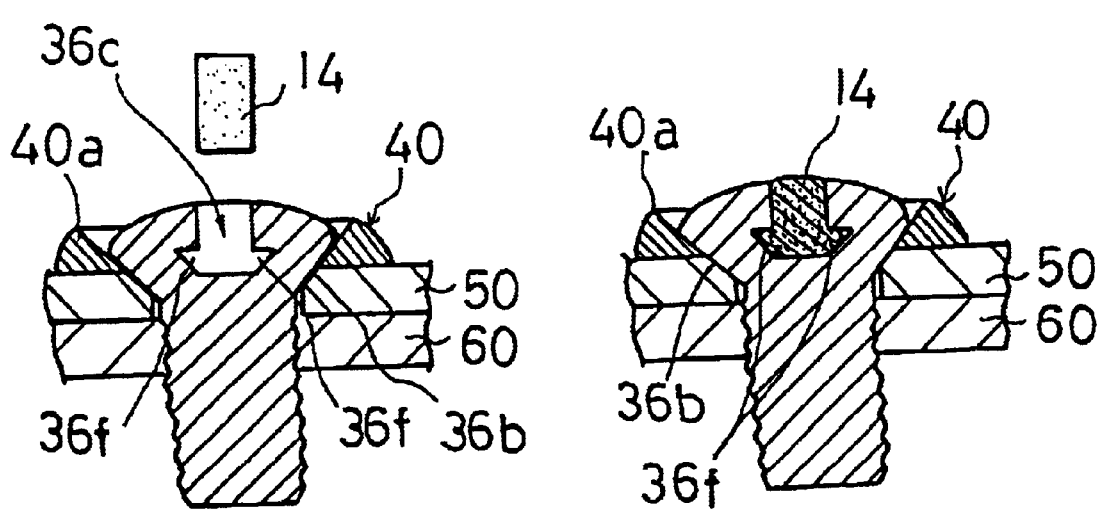
FIG. 12(a)          FIG. 12(b)

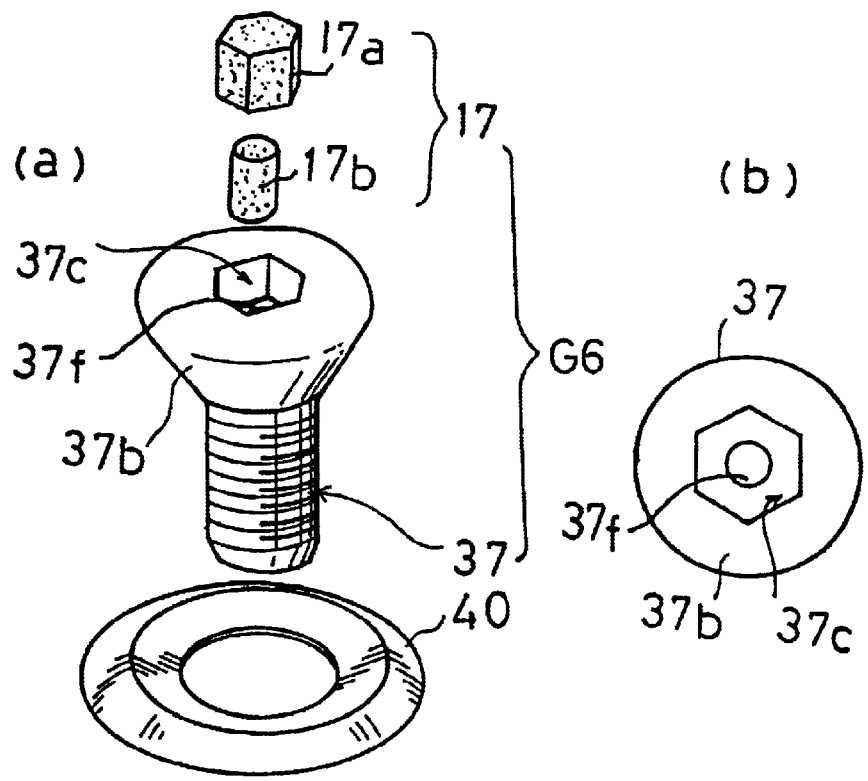
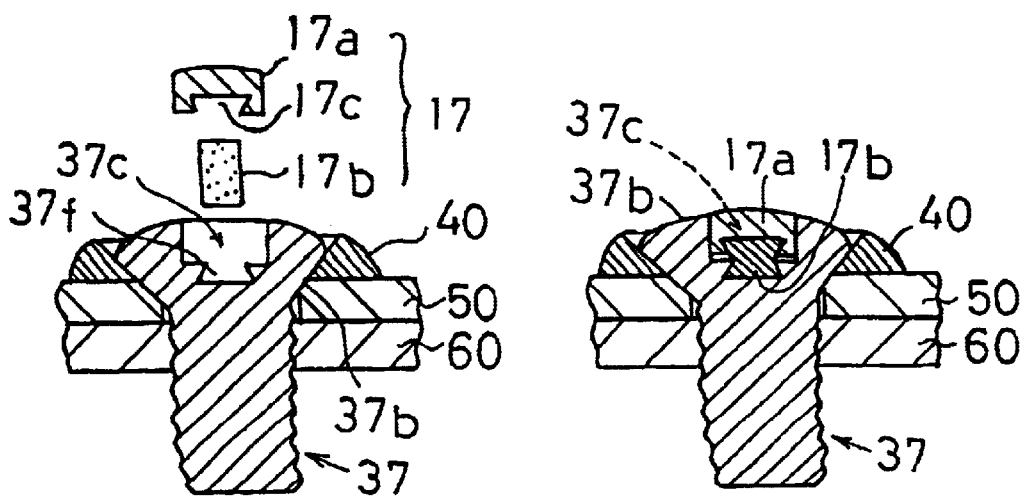
FIG. 13
FIG. 14(a)   FIG. 14(b)

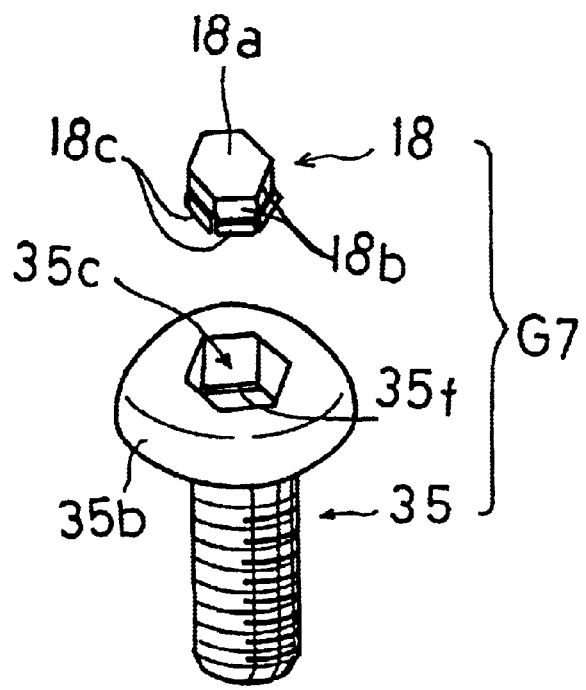
FIG. 15
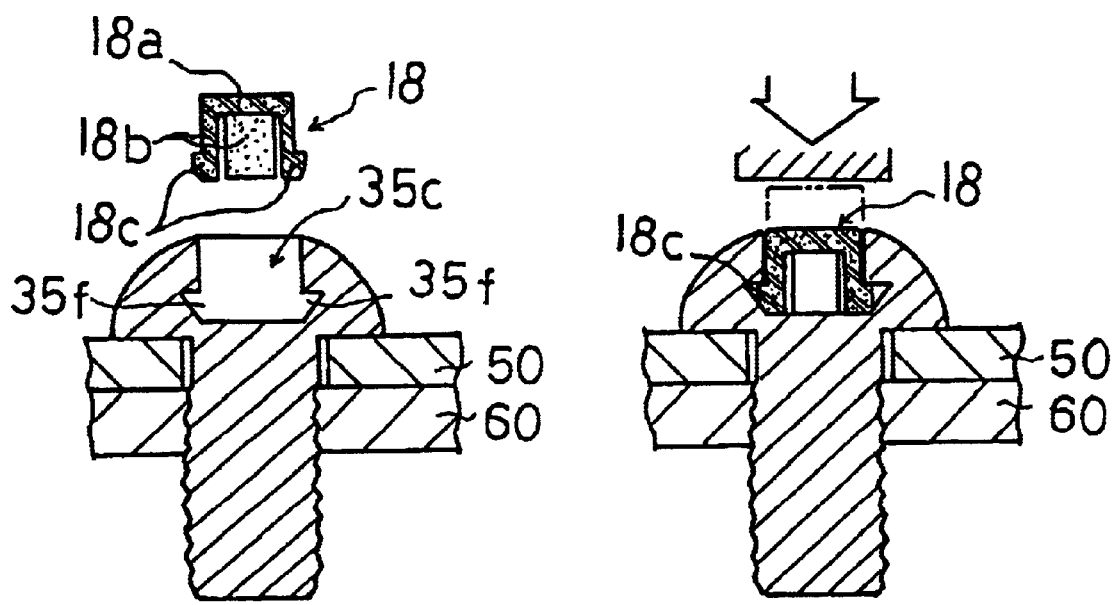
FIG. 16(a)      FIG. 16(b)

CRIME PREVENTION SCREW, EMBEDDING MATERIAL OF SCREW HEAD, SCREW-USE CRIME PREVENTION SEAT AND CRIME PREVENTION SCREW SET

BACKGROUND OF THE INVENTION

1. Field of the Invention

The present invention relates to a crime prevention screw that after the screw is tightened in desired places, a recessed portion, such as square socket, hexagon socket, cross socket and slot, formed on a screw head is covered and hence drawing-out of the screw with the intention of prank and crime can be prevented, an embedding material of a screw head for embedding in a recessed portion of the crime prevention screw, a screw-use crime prevention seat for preventing the crime prevention screw from being drawn out using tools such as pincers and pliers, and a crime prevention screw set composed of their combination.

2. Description of the Related Art

A screw of the conventional art is constituted so that a screw head is formed on a base end of a screw main body where a spiral groove is formed on its outer peripheral surface. Such a screw has heads of various shapes. Example of a machine screw are a flat fillister head screw, a round head screw, an oval fillister head screw, a pan head screw, a binding head screw, a truss head screw, a countersunk fillister head screw and an oval head screw. These screw heads are formed with recessed portions composed of sockets or grooves such as a square socket, a hexagon socket, a cross socket and a slot for engaging an end portion of a tool such as a square spanner and a driver and rotating the screws. Another example is a bolt having a hexagonal head (screw head) which is one kind of a screw, and this bolt head (screw head) is formed with such a recessed portion.

In addition, conventionally a flat seat having a doughnut shape viewed from top which is fitted into a screw main body and is received by the screw head is used for the above screws.

These screws are used in various fields. For example, as shown in FIGS. 1 and 2, a number plate 2 is attached to a car body 1 of an automobile A by using screws 3, 3. In this case, conventionally screws 31, 31 having a hexagonal head that the surface of the hexagonal head is formed with a cross socket, or circle fillister head screws are generally used.

Further, a car stereo and a car navigation device which are provided in a room of the automobile A are similarly fixed by countersunk head screws.

In addition, as shown in FIGS. 3 and 4(*a*), for example, a metal-made crime prevention grid P is generally attached to an outside of a window W of a house for crime-prevention countermeasure. Lattice main bodies 4, and upper and lower lateral materials 5 and 6 of the metal grid B are assembled and fixed also by using screws 3. In this case, as shown in FIG. 4(*b*), countersunk head screws 32 that a cross socket is formed on their screw heads, circle fillister head screws or pan head screws, not shown, are used. Moreover, as shown in FIGS. 4(*a*) and 4(*b*), also in the case where the grid P is attached to the outside of the window W, the grip P is fixed to a sash 7 that an end portion of a stay 6 of the grid P is formed integrally with a window rail by using slightly larger screws 3 such as countersunk head screws or pan head screws.

When the number plate 2 is attached to the car body 1 and the grid P is attached to the outside of the window W by using the above-mentioned various screws 3 of the conventional art, the following problems arise.

More concretely, even if the number plate 2 is attached to the car body 1 by using the screws 3 (for example, the screws 31, 31) of the conventional art, the screws 3 (31) can be drawn out by using a tool such as a plus driver or a small spanner. For this reason, when or after a car is stolen, the number plate 2 is easily removed or easily replaced by another one.

When the number plate 2 is removed or replaced by another stolen number plate, it is difficult to find the stolen car. For this reason, the case that stolen high-grade cars are exported abruptly increases in many places. Moreover, cases of stealing, robbery and kidnap using stolen cars with feigned number plates occurred frequently in times past. Further, the case that screws which fix a car stereo and a car navigation device to the automobile A are loosened and these devices are stolen are increasing.

As mentioned above, when the lattice main bodies 4, and the upper and lower stays 5, 6 are fixed by using the screws 3 (32) of the conventional art or the grid P is attached to the sash 7 by using the screws 3 of the conventional art, these screws 3 (32), 3 are drawn out on the outside of a house so that the lattice main bodies 4 and the entire grid P can be removed easily. In particular, inhabitants consider that the crime prevention is sufficient because the grid P is attached to the outside of the window W, so that they frequently leave the window W open and unlocked. For this reason, the case that a thief removes the grid R easily and opens a screen 9 and the window glasses 10, 11 and intrudes through the window W into the house and infringes stealing and felonious crime occurs frequently.

In the light of the fact that the screw can be remove easily as one reason which easily causes the above cases, the inventors of the invention have proceeded to develop a new screw which cannot be easily removed after it is once tightened. As a result of their enthusiasm examination, finally they have devised a crime prevention screw which cannot be loosened or removed even by using a tool such as a driver or a square bar spanner after the screw is once tightened, a screw head embedding material which can be used for not only this crime prevention screw but also screws conventionally in the market, and a screw-use crime prevention seat which prevents a screw head from being pinched and being rotated through a tool such as pincers or a spanner.

SUMMARY OF THE INVENTION

It is an object of the present invention which has been finished through such a prehistory to provide a crime prevention screw that after the screw is tightened in predetermined places, an embedding material is embedded in a recessed portion composed of a square socket, a hexagon socket, a cross socket or a slot formed on a screw head so that the screw can be prevented from being drawn out with the intention of many pranks and malignant crimes. Example of such crimes are car stealing through removal of a number plate of an automobile, resale and export of stolen automobiles, stealing and robbery or kidnapping using a stolen car, stealing of a car stereo and a car navigation device in an automobile, intrusion of a thief and a public enemy through a window into a house by means of drawing out of screws for fixing a grid to the window or screws for attaching a grid to a sash of the window.

Further, it is an object of the present invention to provide an embedding material of a screw head which embeds in screw heads of various screws including such a crime prevention screw and is capable of fixing the screws so as to prevent the screws from being drawn out.

Furthermore, it is an another object of the invention to provide a screw-use crime prevention seat which can prevent a prank that the screw head is pinched by pincers or pliers to be loosened and drawn out (in the case where such prank cannot be prevented by even using the crime prevention screw and the embedding material) and the above-mentioned crimes derived from this prank.

Further, it is still another object of the invention to provide a crime prevention screw set composed of the crime prevention screw and the embedding material or a crime prevention screw set composed of the crime prevention screw and the embedding material and the screw-use crime prevention seat.

A crime prevention screw of the present invention from a first aspect which is one of means to solve the above problems, is characterized in that a recessed portion which is composed of a square socket, a hexagon socket, a cross socket or a slot for engaging and rotating an end portion of a tool such as a square bar spanner or a driver is formed on a screw head, and a recessed engagement portion is formed on a partial place of an inner wall of the recessed portion such that one of an expanded portion formed by buckling a part of an embedding material for embedding in the recessed portion and a protrusion to which a force is applied to the side of the embedding material for embedding in the recessed portion comes into the engagement portion, whereby the embedding material is prevented from coming off.

The basic technical idea of the crime prevention screw of the present invention is characterized in that after the screw is tightened, an embedding material is embedded in a socket or a groove such as a square socket, a hexagon socket, a cross socket or a slot so as not to loosen and remove the screw using a tool such as a square bar spanner or a driver. However, only when the embedding material simply embeds in the socket or the groove, the embedding material easily comes off or is drawn out forcibly by catching it through an end of the tool such as a driver. For this reason, the inventors have finished the crime prevention screw in combination with a plurality of techniques for preventing the embedding material from coming off.

Its one example is the crime prevention screw of the first aspect. The crime prevention screw is a neologism that a screw which can take a crime-prevention measure is simplified. Since the socket or the groove such as a square socket, a hexagon socket, a cross socket or a slot formed on a screw head cannot be expressed by a generic term, the recessed portion is used in the present invention in order to avoid redundant expression.

In the present invention, before the explanation about how to embed and fix the embedding material in/to the recessed portion formed on the screw head of the crime prevention screw of the first aspect, the embedding material to be used in the first aspect will be simply explained.

In the present invention, the most suitable examples of the embedding material to be used for the crime prevention screw of the first aspect are the following two kinds of embedding materials. One is an embedding material which has a size and a shape such that it can fitted into the recessed portion of the screw head of the crime prevention screw in a state that its one portion remains outside and is formed by a soft material such that at least its end portion is buckled easily. This embedding material is embedded into the recessed portion by tapping the portion extended from the recessed portion using a hammer or the like until this portion is flush with the screw head and buckling the end portion.

The other one is an embedding material which has a size such that it can just fitted into the recessed portion and has a vicinity portion including the end of its side surface to which a force directing outward is applied and is formed with a protrusion facing sideways at its end portion.

In the present invention, the crime prevention screw of the first aspect is constituted so that a recessed engagement portion is formed at a partial place of the inner wall of the recessed portion and a portion or a protrusion of the embedding material which is buckled to be expanded sideways is pushed into the engagement portion, whereby the embedding material is prevented from coming out of the recessed portion.

As for the most suitable place of the inner wall of the recessed portion where the engagement portion is provided, the inward end portion of the inner wall is the most suitable, and it is the most suitable that the engagement portion is formed slightly wide to be slightly higher than the inward end portion. This is because the buckled and expanded portion of the above-mentioned former embedding material easily come into and is engaged with the recessed portion and the applied force of the above-mentioned latter embedding material acts the most efficiently.

In addition, in the case where, for example, the recessed portion is a hexagon socket, as to the engagement portion is formed wide along its entire periphery or a part of the engagement portion is formed wide is not necessarily limited. However, the former state is the most suitable because the engagement due to the buckling and the protrusion should be desirably carried out securely.

The shape of the engagement portion is not particularly limited as long as the buckled portion and the protrusion come into the engagement portion easily and they do not comes out of it. It is necessary to provide a shape such that the recessed portion is not cracked and is deformed or broken when the screw is tightened by operating a square bar spanner or a driver before the embedding material is used.

Furthermore, a center portion of the bottom of the recessed portion may be formed to be slightly high so that the embedding material is buckled to be easily expanded sideways.

There will be detailed below a crime prevention screw according to a second aspect of the present invention.

In the present invention, a crime prevention screw of the second aspect is characterized in that a recessed portion which is composed of a square socket, a hexagon socket, a cross socket or a slot for engaging and rotating an end portion of a tool such as a square bar spanner or a driver is formed on a screw head, and a recessed engagement portion where its inside is wider than an entrance is formed on a bottom portion of the recessed portion such that one of a protrusion formed at an end of an embedding material for embedding in the recessed portion and one end portion of a connecting member for connecting the embedding material to the screw head comes into the engagement portion, whereby the embedding material is prevented from coming off.

In the present invention, the crime prevention screw of the first aspect is constituted so that the engagement portion is formed on the side wall of the recessed portion, but the crime prevention screw of the second aspect is constituted so that the engagement portion is formed on the bottom of the recessed portion. The above-mentioned contents are directly applied to the other portions.

In the present invention, in both the crime prevention screw of the second aspect and the crime prevention screw of the first aspect, an embedding material is embedded in the recessed portion of the crime prevention screw and is prevented from coming off. The following two kinds of embedding materials are applied to the crime prevention screw of the second aspect.

One is an embedding material that a protrusion, which has a size with an allowance such that it is pushed into the engagement portion formed on the bottom of the recessed portion and is easily buckled, is formed at an end portion of an embedding material main body having a shape such that it can be just embedded in the recessed portion of the crime prevention screw. The protrusion is formed by a soft metal material such as lead, copper, zinc, aluminum or tin, or alloy mainly containing one kind or plural kinds of them.

The other one is an embedding material which is composed of two members: an embedding material main body; and a connecting member. The embedding material main body has a shape such that it can be just embedded in the recessed portion of the crime prevention screw and is formed with a recessed engagement portion, which is opposed to the engagement portion of the crime prevention screw, on its lower surface. The connecting member has a size with an allowance such that it is pushed into both the engagement portions and is formed by a soft metal material, which is easily buckled, such as lead, copper, zinc, aluminum or tin, or alloy mainly containing one kind or plural kinds of them.

The former embedding material which is in the state that its protrusion is pushed into the engagement portion formed on the bottom of the crime prevention screw is tapped by a hammer until the embedding material main body is flush with the surface of the screw head. As a result, the protrusion is buckled in the engagement portion to be expanded sideways, and the embedding material main body is fixed securely not to come out of it.

As for the latter embedding material, in the state that one end portion of the connecting member is put into the engagement portion of the embedding material main body, the other end of the connecting member is pushed into the recessed engagement portion of the crime prevention screw, and the embedding material main body is tapped by a hammer until it is flush with the surface of the screw head. As a result, both ends of the protrusion are buckled in both the engagement portions so as to be expanded sideways and engaged with them so that the embedding material main body is fixed securely so as not to come out of it.

As to which embedding material is used, it depends upon the size of the crime prevention screw and the height of the screw head. The former embedding material is suitable for the case of a comparatively small screw, and the latter embedding material is suitable for the cases of a comparatively large crime prevention screw and a crime prevention screw that the screw head is comparatively high.

The inside of the engagement portion is wider than its entrance so that the soft metal material is buckled in the engagement portion of the crime prevention screw of the second aspect. The shape of the engagement portion is not particularly limited as long as the shape can prevent the above-mentioned coming-off. For example, the shape may be like a spiral socket with a big pitch and a deep depth.

A type of the crime prevention screws of the first and second aspects is not necessarily limited as long as the screw has at least the above-mentioned engagement portion. Suitable examples of various crime prevention screws having such an engagement portion are a machine screw, a set screw, a square screw, an embedded screw, a bolt and a wood screw, and one of them can be selected.

The machine screw is a small screw which is threaded into a tapped hole. Examples of the machine screw having various screw head shapes are a flat fillister head screw, a round head screw, an oval fillister head screw, a pan head screw, a binding head screw, a truss head screw, a flat countersunk head screw and an oval head screw. The square screw is a screw having square spiral groove and thread. The bolt is a screw corresponding to a nut, and in the present invention the bolt the above-mentioned recessed portion should be formed on the screw head of the bolt. However, in the case where a bolt having a hexagonal screw head is used, a screw-use crime prevention seat, mentioned later, should be used so as to prevent the bolt from being loosened and being removed by a spanner.

The respective recessed portions of the crime prevention screw of the first aspect having such a shape are formed by cutting by means of a tool such as a special gullet cutting edge or a tap or an automatic machine having the cutting edge of these tools at the manufacturing step. However, a screw in the market can be finished through such a process.

After the crime prevention screw is tightened in desired places as explained above, the embedding material is embedded in the recessed portion of the screw head of the crime prevention screw so as not to come out of it. As a result, the crime prevention screw cannot be loosened or removed by using a square bar spanner or a driver, and hence various crimes and pranks can be prevented.

Even if the square bar spanner or the driver cannot be used, in the case where the screw head of the crime prevention screw has a shape such that the screw head can be pinched by a tool such as pincers or pliers, namely, a shape with comparatively less roundness like a flat fillister head screw, an oval fillister head screw or a pan head screw or in the case of a high set screw with a hexagon socket, these screws can be pinched and rotated by the tool. For this reason, it is desirable that the crime prevention screws having the screw heads of such shapes are changed so as to have a shape such that the screw heads hardly pinched by the tool such as pincers or pliers.

Therefore, as one of its countermeasures, a fourth aspect of the present invention specifies that the screw head of the crime prevention screw of the first or second aspect has a curved surface shape such that the screw head is hardly pinched by a pinching tool such as pincers. Namely, the entire screw head has roundness like a round head screw or has an almost flat shape like a flat countersunk head screw.

There will be explained below the embedding material of the present invention.

The embedding material has various shapes corresponding to the recessed portions of the screw head of the crime prevention screws, and has various engagement structures for preventing the coming-off as mentioned above. The inventors judges that the present invention cannot be carried out only with the above-mentioned crime prevention screws and the embedding material should be also claimed. For this reason, the embedding material is also constituted so as to cover the scope of right.

One example of such an embedding material is an embedding material of a screw according to a fifth aspect.

The embedding material of a screw head according to the fifth aspect (hereinafter, the embedding material) for embedding in the recessed portion for pushing a tool thereinto, composed of a square socket, a hexagon socket, a cross socket or a slot, the recessed portion being formed on the screw head of the crime prevention screw according to one of the first through fourth aspects, is characterized in that the embedding material has a shape and a size such that it can be buckled in and can embed in the recessed portion and at least an end portion of the embedding material is made of a soft metal material which can be buckled and mainly contains soft iron, lead, copper, zinc, aluminum or tin, or one kind or plural kinds of them.

In the present invention, the embedding material of a screw head according to the fifth aspect (hereinafter, the embedding material) have various shapes corresponding to the recessed portion of the crime prevention screws and has a size such that it is higher than the recessed portion by assumed buckling. A shape of the assumed buckled portion corresponds to a position in the recessed portion where the engagement portion is formed.

The embedding materials of the present invention has end portions of two kinds of shapes.

One shape corresponds to the crime prevention screw that the engagement portion is formed on the side wall of the recessed portion. The end portion of the embedding material corresponding to the engagement portion has a shape such that it has a width along the entire bottom surface of the recessed portion and has a height for assumed buckling. On the contrary, the end portion of the embedding material corresponding to the crime prevention screw that the engagement portion is formed on the bottom of the recessed portion has a shape such that it has a width which can be inserted into the engagement portion and has a height for assumed buckling.

In the present invention, the embedding material of the fifth aspect is constituted so that at least the end portion for assumed buckling is made of the above-mentioned soft metal material. Namely, the entire embedding material is made of the soft metal material is also included in the present invention. The buckling means that a compressing force is applied from a lateral direction and one portion is deformed to be expanded sideways. For example, the case where one portion is cracked to be expanded sideways is also included in the buckling. As one method, the bottom of the embedding material may be slightly recessed so that the buckling becomes easy.

The embedding material having such a shape is selected according to a type of the crime prevention screw and after the crime prevention screw is tightened, the embedding material is tapped into the recessed portion formed on the screw head by a hammer or the like so as to be embedded in the recessed portion of the screw head completely. Since the engagement due to the buckling is carried out in the inward end of the recessed portion, the embedding material does not come off, and even if the embedding material is tried to removed forcibly by using an end portion of the driver, it does not come off.

An embedding material of a screw head of a sixth aspect depending from the embedding material of the fifth aspect is characterized in that the embedding material has a shape and a size such that it can be buckled in and can embed in the recessed portion for pushing a tool thereinto, which is formed on the screw head of the crime prevention screw and is composed of a square socket, a hexagonal socket, a cross socket and a slot, and is composed of two members: an embedding material main body which is formed with a recessed engagement portion having a shape such that an inside is wider than an entrance at its end surface; and a connecting member which is buckled in both this engagement portion and the recessed engagement portion formed on the bottom portion of the crime prevention screw that its inside is wider than its entrance so as to fix the embedding material main body in the recessed portion of the crime prevention screw and is made of a soft metal material mainly containing lead, copper, zinc, aluminum or tin, or one kind or plural kinds of them.

The embedding material according to the sixth aspect is composed of the two members: the embedding material main body for embedding in the recessed portion of the screw head of the crime prevention screw; and the connecting member for fixing the embedding material main body into the recessed portion. This embedding material corresponds to the crime prevention screw of the second aspect.

The embedding material main body may be formed by the above-mentioned soft metal material, but it is desirable that it is formed by a comparatively hard metal material such as stainless, iron or super steel such that the shape is not broken when it is tapped into the recessed portion. When the embedding material main body is formed by the comparatively hard metal material, even if the embedding material is broken or chipped or by the end of the driver, it is not influenced at all. When the embedding material main body is formed by the material which is the same as the material of the crime prevention screw, the embedded portion is hardly recognized and the appearance becomes good.

The above-mentioned embedding material is buckled so as not to come off, but the embedding material of the present invention is not limited to this engagement structure.

One example of such an embedding material is an embedding material according to a seventh aspect of the present invention.

An embedding material of a screw head according to the seventh aspect (hereinafter, the embedding material) for embedding in the recessed portion, for pushing a tool thereinto, composed of a square socket, a hexagon socket, a cross socket or a slot and formed on the screw head of the various crime prevention screw is characterized in that the embedding material has a shape and a size such that it can be pressed into the recessed portion and an end portion of the embedding material is formed with a protrusion which comes into the engagement portion of the first or second aspect with a force is applied to the protrusion.

This embedding material corresponds to the crime prevention screw that the engagement portion is formed on the side wall of the recessed portion in the above-mentioned crime prevention screws. The embedding material embeds in the recessed portion and the protrusion formed on the end portion on the side wall of the embedding material is pushed into the engagement portion so that the embedding material are prevented from coming off.

This embedding material is roughly classified into two types.

One of them is an embedding material such that four side edges of a metal spring plate are bent downward so as to have a shape corresponding to the inner wall of the recessed portion and the lower end edges is slightly bent outward, preferably obliquely upper outward and when the embedding material is put into the recessed portion, the protrusion as the slightly bent portion is engaged with the engagement portion of the crime prevention screw with a force is applied to the protrusion. The center surface of the embedding material embeds in the recessed portion, and this embedding material corresponds to the crime prevention screw having a large recessed portion due to a problem of figuration. The surface portion at least should not be protruded from the recessed portion.

The other one is a resin-made embedding material and this embedding material also has the approximately same shape and function as those of the above-mentioned embedding material formed by the metal spring plate. After the embedding material is embedded in the recessed portion of the crime prevention screw, the upper surface should be thick or a metal plate corresponding to a size of the recessed portion should be fixed to the upper surface so that the embedding material is not broken by the end portion of a driver. The embedding material of the seventh aspect is fixed only by pressurizing it into the recessed portion of the crime prevention screw.

There will be explained below an embedding material of a screw head according to an eighth aspect of the present invention.

In the present invention, an embedding material of a screw head according to the eighth aspect (hereinafter, the embedding material) is characterized in that the embedding material is a material for embedding in the recessed portion, for pushing a tool thereinto, composed of a square socket, a hexagon socket, a cross socket or a slot and has a shape and a size such that it can embed in the recessed portion through tapping or pressurizing-into and a suitable portion of its side wall is formed with rags or burrs for preventing the embedding material from coming off.

This embedding material is different from the above-mentioned embedding materials and can correspond also to screws of the conventional art in the market.

This embedding material has a shape such that it can be just fitted into the recessed portion formed on the screw head such as a square socket, a hexagon socket, a cross socket or a slot and is made of hard metal such as iron, stainless or super steel. Its side surface is formed with rags or burrs.

The rags are tilted protrusions having an acute angle which cut into the inner wall of the recessed portion formed on the screw head and are tilted to a direction where the embedding material does not come off. A size and a number of the rags are not particularly limited as long as at least the embedding material can be pushed into the recessed portion and is strongly engaged with the recessed portion so as not to come out of it.

The burrs are substitutes for the rags and are formed sideways on a peripheral edge of the end portion of the embedding material.

Such an embedding material is convenient and economical because it can convert various screws conventionally in the market into crime prevention screws.

The above explanation referred to that when the screw head of the crime prevention screw is formed into a round shape, it is hardly pinched by a tool such as pincers or pliers. It is originally desirable that the shape of the screw head can be selected freely according to attaching places, and a shape such that the screw head can be pinched easily by pincers or pliers is occasionally required.

In order to cope with such a case, the present invention according to a ninth aspect is constituted so that even if such a screw is used, the tightened screw is prevented from being loosened or being drawn out by using a crime prevention seat.

A screw-use crime prevention seat of the ninth aspect (hereinafter, the crime prevention seat) having a doughnut shape viewed from top such that the crime prevention seat is fitted into the screw main body of the crime prevention screw according to one of the first through fourth aspects and is received by the screw head, is characterized in that a rise portion having roundness, which surrounds the side wall of the screw head and is hardly nipped by a tool such as pincers or pliers, is formed around the seat.

This crime prevention seat corresponding to a shape and a size of the screw head to be used is prepared. It is desirable that an outer peripheral portion of the rise portion is formed by a round tilted surface like a screw head of a round head screw and its height is about the same as a height of the screw head. A lower step portion surrounded by the rise portion has the approximately same diameter as an outer peripheral diameter of the screw head, and its center is formed with a hole for inserting the main body of the screw thereinto.

When this crime prevention seat is used, the seat prevents the screw head from being pinched by the tool such as pincers or pliers. Further, even if the crime prevention seat is tried to be pinched by the tool, it cannot be pinched due to slipping. Moreover, the crime prevention seat is tried to be pinched forcibly, only the seat is rotated idly so that the crime prevention screw is not loosen or drawn out. For this reason, the screw cannot be drawn out mockingly or with the intention of crimes. As a result, the crime prevention seat is not required for the screw such as a round head screw having a shape such that its screw head is hardly pinched by the tools.

This crime prevention seat is used together with the crime prevention screw and the embedding material of the present invention so as to display its function. Namely, when the crime prevention seat is pushed into the crime prevention screw and the crime prevention screw is tightened in desired places, it is necessary to engage the end portion of the tool such as the square bar spanner or the driver with the recessed portion of the screw head and tighten the screw. This is because if the embedding material is not embedded in the recessed portion after the screw is tightened, the screw is loosened or drawn out by using the tool.

If the various screws including the above-mentioned crime prevention screws and the embedding materials are not combined as sets correspondingly, they are not convenient and are hardly sold. This is applied also to the crime prevention seat.

For this reason, in a tenth aspect, the inventors allows also a crime prevention screw set, which is composed of combinations of the crime prevention screw according to one of the first through fourth aspects or the other various screws, the embedding material of a screw head according to one of the fifth through eighth aspects and/or the screw-use crime prevention seat according to the ninth aspect, to cover the present invention.

In the present invention, as for various screws, various screws conventionally in the market can be used suitably.

BRIEF DESCRIPTION OF THE DRAWINGS

FIG. 5 is a perspective view showing a crime prevention screw according to a first embodiment of the present invention and a corresponding embedding material according to the first embodiment.

FIG. 6(a) is a front cross sectional view showing the first step of a using method of the crime prevention screw and the embedding material.

FIG. 6(b) is a front cross sectional view showing the final step of the using method of the crime prevention screw and the embedding material.

FIG. 9 is a perspective view showing a crime prevention screw according to a third embodiment of the present invention and a corresponding embedding material according to the third embodiment.

FIG. 10(a) is a front cross sectional view showing the first step of a using method of the crime prevention screw and the embedding material.

FIG. 10(b) is a front cross sectional view showing the final step of the using method of the crime prevention screw and the embedding material.

FIG. 11 is a perspective view showing a crime prevention screw according to a fourth embodiment of the present invention and the corresponding embedding material according to the first embodiment.

FIG. 12(a) is a front cross sectional view showing the first step of a using method of the crime prevention screw and the embedding material.

FIG. 12(b) is a front cross sectional view showing the final step of the using method of the crime prevention screw and the embedding material.

FIG. 13 is a perspective view showing a crime prevention screw according to a sixth embodiment of the present invention and the corresponding embedding material according to the fourth embodiment.

FIG. 14(a) is a front cross sectional view showing the first step of a using method of the crime prevention screw and the embedding material.

FIG. 14(b) is a front cross sectional view showing the final step of the using method of the crime prevention screw and the embedding material.

FIG. 15 is a perspective view showing the crime prevention screw according to the third embodiment of the present invention and a corresponding embedding material according to a fifth embodiment.

FIG. 16(a) is a front cross sectional view showing the first step of a using method of the crime prevention screw and the embedding material.

FIG. 16(b) is a front cross sectional view showing the final step of the using method of the crime prevention screw and the embedding material.

DETAILED DESCRIPTION OF PREFERRED EMBODIMENTS

Figure 1:
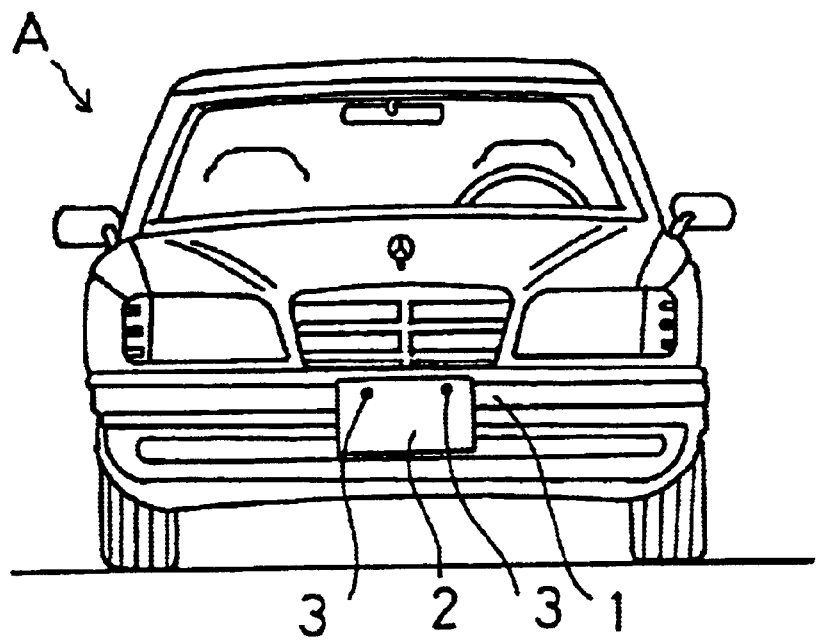
FIG. 1 is a front view of an automobile showing a state that a number plate is attached to a car body by using screws of the conventional art.
Figure 2:
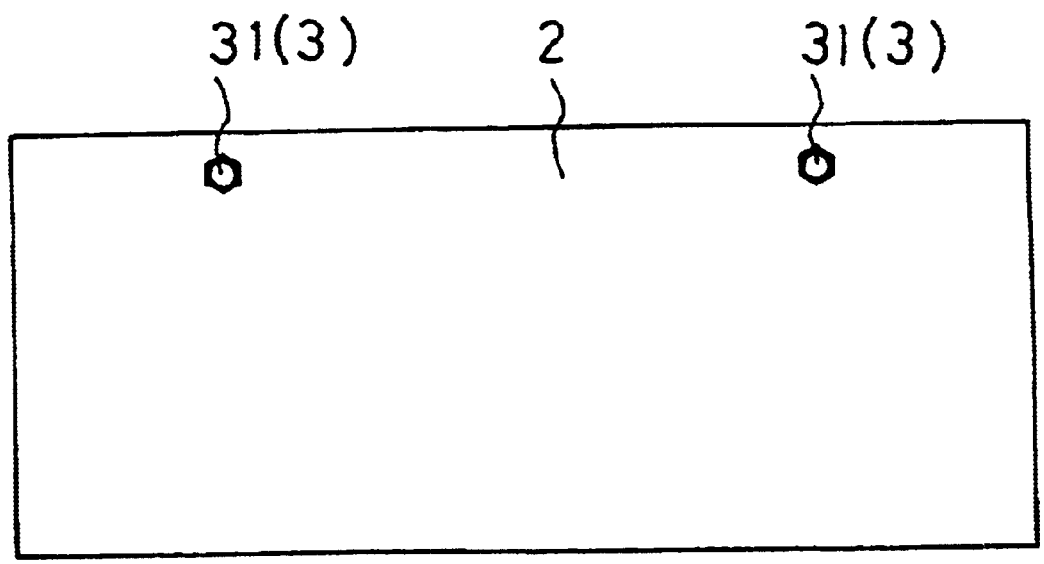
FIG. 2 is an enlarged diagram showing a main section of FIG. 1.
Figure 3:
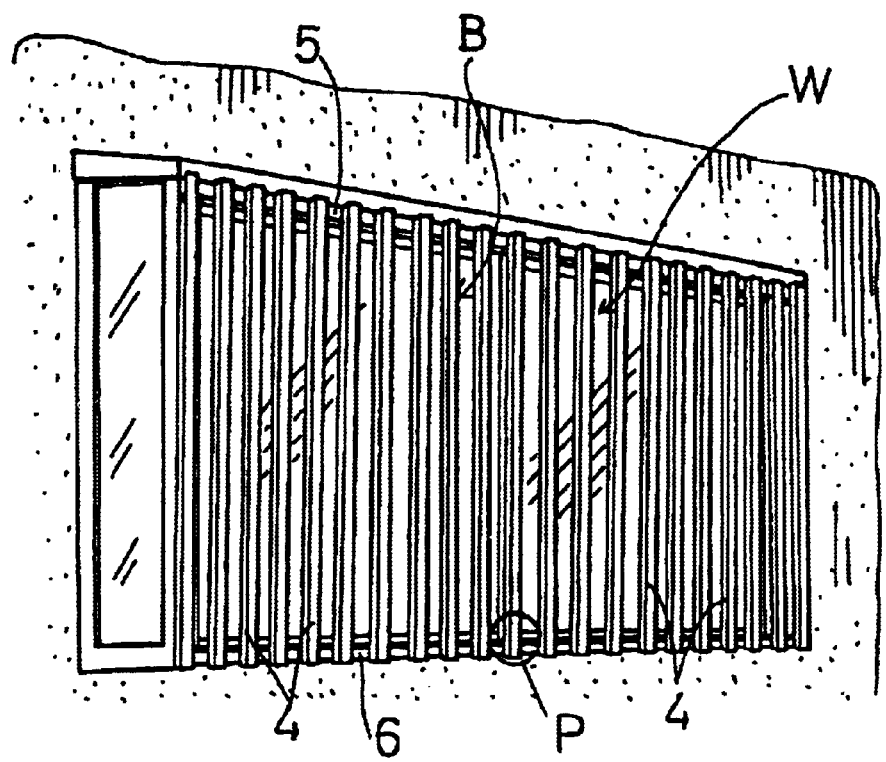
FIG. 3 is a perspective view showing a state that a grid is attached to a window frame by using the screws of the conventional art.
Figure 4:
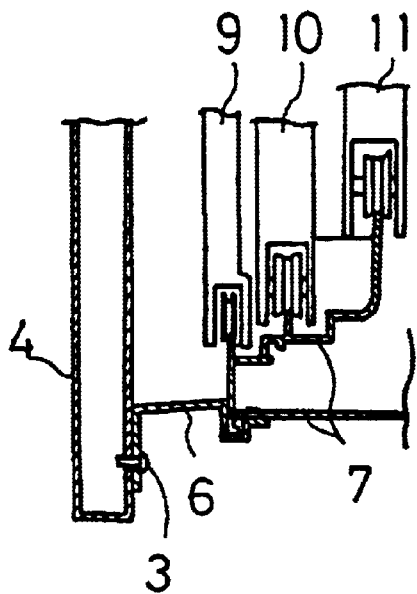
FIG. 4(a) is a side cross sectional view showing an enlarged main section of FIG. 3.
FIG. 4(b) is a side cross sectional view showing an enlarged main section of FIG. 3.
Figure 4B:
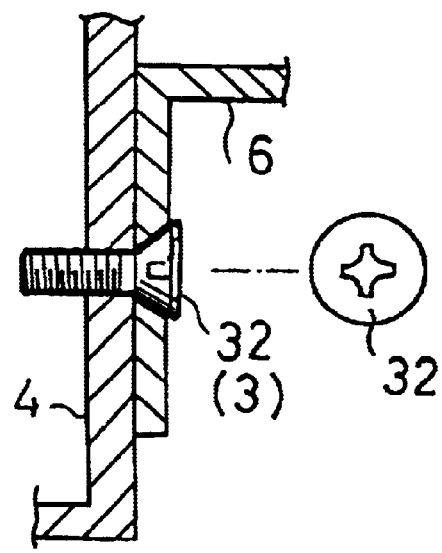

The objects and structures of the present invention are as mentioned above. There will be detailed below concrete embodiments of a crime prevention screw, an embedding material and a crime prevention seat of the present invention with reference to the examples shown in the attached drawings. In the attached drawings, the same reference numerals are given to overlapped portions and the description thereof is omitted.

There will be explained below a crime prevention screw according to a first embodiment of the present invention and an embedding material of a screw head corresponding to this crime prevention screw with reference to FIGS. 5, 6(a) and 6(b).

As shown in FIGS. 5 and 6(a), the crime prevention screw 33 according to the first embodiment of the present invention (hereinafter, the crime prevention screw of the first embodiment) is an oval head screw that a circular (viewed from top) screw head 33b is formed on a base portion of a screw main body 33a on which a spiral groove is engraved. A hexagonal recessed portion 33c is formed on an upper center surface of the screw head 33b, and a recessed engagement portion 33f which is integral with a bottom 33e of the recessed portion 33c is formed laterally around an inward end portion of an inner wall 33d of the recessed portion 33c. This hexagonal recessed portion 33c is a socket for engaging an end portion of a hexagonal bar spanner (called also as a hexagonal bar wrench), not shown, for rotating to tighten the crime prevention screw 33. In this embodiment, the engagement portion 33f is a space with a slight height which becomes wider upward.

An embedding material 14 of the screw head corresponding to the crime prevention screw 33 of the first embodiment (hereinafter, the embedding material of the first embodiment) is just fitted into the recessed portion 33c and has a size such that its one portion is projected from the recessed portion 33c. The embedding material 14 is formed by a soft metal material which can be buckled and is mainly composed of soft iron, lead, copper, zinc, aluminum, tin, or one kind or plural kinds of these materials.

The crime prevention screw 33 of the first embodiment having such a structure is, as shown in FIG. 6(a) for example, used for the case where two members 50, 60 are fixed. When they are fixed, a tapped hole 60a is formed on a base member 60 and a countersink 50a is opened on the member 50 to be fixed, and both the holes 50a, 60a are matched with each other so that the screw main body 33a is fitted from the countersink 50a into the tapped hole 60a. This operation is performed by pushing the end portion of the hexagonal bar wrench, not shown, into the recessed portion 33c formed on the screw head 33b and rotating the hexagonal bar wrench.

After the two members 50, 60 are fixed by using the crime prevention screw 33 of the first embodiment in such a manner, as shown in FIGS. 6(a) to 6(b), the embedding material 14 of the first embodiment is pushed into the recessed portion 33c of the screw head 33b so as to be embedded in the recessed portion 33c.

As for the embedding operation of the embedding material 14, the embedding material 14 is put into the recessed portion 33b and as shown in FIG. 6(b) the upper end of the embedding material 14 which is projected upward from the recessed portion 33*b* is tapped by a hammer or the like so that the embedding material 14 is embedded in the recessed portion 33*b* completely. As a result, since the embedding material 14 is formed by the soft metal material, a lower portion of the embedding material 14 is pushed into the bottom 33*e* of the recessed portion 33*b* strongly to be buckled and the buckled portion spreads sideways. The spread portion 14*a* goes into the space as the engagement portion 33*f* in the recessed portion 33*b* so as to be caught in the engagement portion 33*f*. Moreover, since the entire embedding material 14 is pushed against the recessed portion 33*c* by the tapping, the embedding material 14 cannot slip out of the recessed portion 33*c* or cannot be drawn out forcibly.

The crime prevention screw 33 of the first embodiment and the embedding material 14 of the first embodiment may be sold separately, but a screw set G1 composed of the crime prevention screw 33 and the embedding material 14 is convenient because the screw set prevents consumers from buying or using an inappropriate embedding material.

There will be explained below a crime prevention screw according to a second embodiment of the present invention and an embedding material of a screw head corresponding to this crime prevention screw with reference to FIGS. 7, 8(*a*) and 8(*b*).

Figure 7:
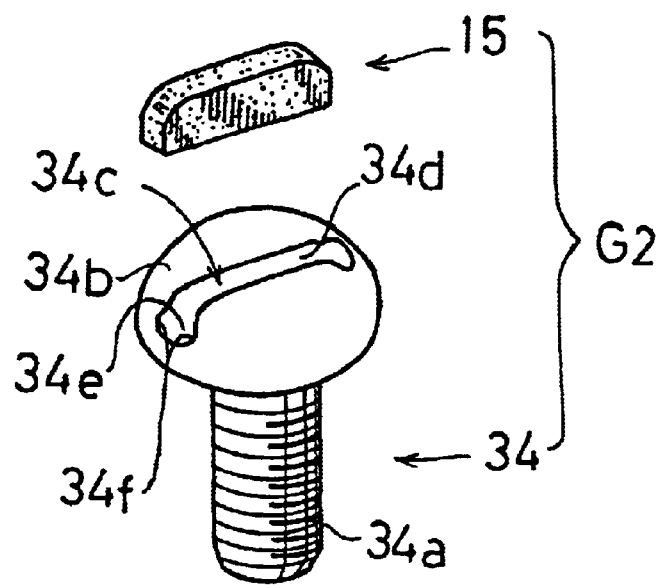
FIG. 7 is a perspective view showing a crime prevention screw according to a second embodiment of the present invention and a corresponding embedding material according to the second embodiment.
Figure 8A:
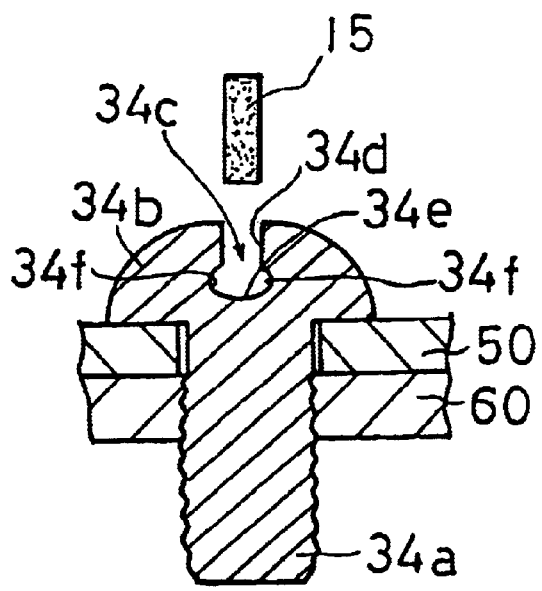
FIG. 8(a) is a front cross sectional view showing the first step of a using method of the crime prevention screw and the embedding material.
Figure 8B:
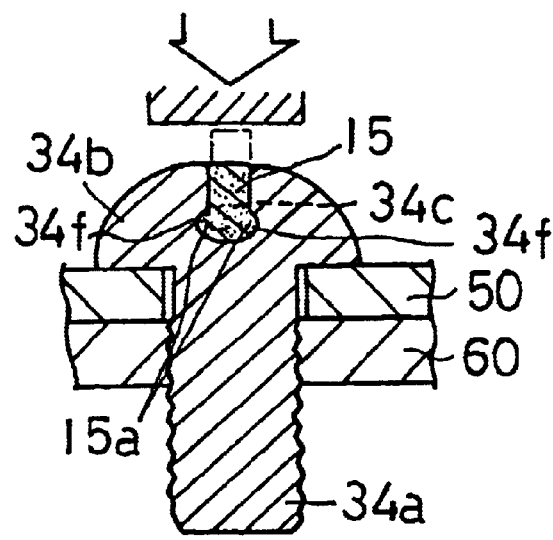
FIG. 8(b) is a front cross sectional view showing the final step of the using method of the crime prevention screw and the embedding material.

As shown in FIGS. 7 and 8(*a*), the crime prevention screw according to the second embodiment of the present invention (hereinafter, the crime prevention screw of the second embodiment) 34 is a round head screw that a round (viewed from top) screw head 34*b* is formed on a base portion of a screw main body 34*a* on which a spiral groove is engraved. A linear (viewed from top) recessed portion 34*c* composed of a slot is formed on an upper center surface of the screw head 34*b*, and a recessed engagement portion 34*f* which is integral with a bottom 34*e* of the recessed portion 34*c* is laterally formed on an inward end portion of an inner wall 34*d* of the recessed portion 34*c*. The recessed portion 34*c* composed of the slot is a socket for engaging an end portion of a minus driver (called also as a flat screwdriver), not shown, for rotating to tighten the crime prevention screw 34. In the present embodiment, the engagement portion 34*f* is a space with slight height formed so as to be expanded sideways.

The crime prevention screw 34 of the second embodiment having such a structure is, as shown in FIG. 8(*a*) for example, used for the case where two members 50, 60 are fixed. This fixing operation is performed in the approximately same procedure as the above-mentioned embodiment 1 by using the minus driver.

After the two members 50, 60 are fixed by using the crime prevention screw 34 of the second embodiment in such a manner, as shown in FIGS. 8(*a*) to 8(*b*), an embedding material 15 of the screw head (hereinafter, the embedding material of the second embodiment) is pushed into the recessed portion 34*c* of the screw head 34*b* so as to be embedded in the recessed portion 34*c*.

The procedure for embedding the embedding material 15 of the second embodiment is the approximately same as that of the first embodiment. The embedding material 15 is inserted into the recessed portion 34*c* of the screw head 34*b* and the upper end portion of the embedding material 14 projected from the recessed portion 33*c* is tapped by a hammer or the like so that the embedding material 15 is embedded in the recessed portion 34*b* completely.

With such a structure, the lower portion of the embedding material 15 is strongly pushed against the bottom 34*e* of the recessed portion 34*b* so as to be buckled and the buckled portion spreads sideways. The spread portion 15*a* goes into a space as the engagement portion 34*f* in the recessed portion 34*b* so as to be engaged with the engagement portion 34*f*. Moreover, since the entire embedding material 14 is pushed against the recessed portion 34*c* by the tapping, the embedding material 15 cannot come out of the recessed portion 34*c*.

It is preferable that the crime prevention screw of the second embodiment and the embedding material 15 of the second embodiment are sold as a crime prevention screw set G2 similarly to the first embodiment.

There will be explained below a crime prevention screw according to a third embodiment of the present invention and an embedding material of a screw head according to another embodiment corresponding to this crime prevention screw with reference to FIGS. 9, 10(*a*) and 10(*b*).

As shown in FIGS. 9 and 10(*a*), the crime prevention screw 35 of the third embodiment is the round head screw 35 that a screw head 35*b* is formed roundly and a hexagonal recessed portion 35*c* is formed on the center of the screw head 35*b*. Since the other portions are the same as those of the above-mentioned crime prevention screw (33), the description thereof is omitted.

An embedding material 16 of a screw head according to another embodiment to be used here (hereinafter, the embedding material of the third embodiment) is slightly different from the embedding material of the first embodiment. The embedding material 16 has an outer peripheral shape such that it is just fitted into the recessed portion 35*c* and is constituted so that a buckling member 16*b* having a lower height than that of an embedding material main body 16*a* is fixed to a lower surface of the embedding material main body 16*a* having a slightly lower height than the height of the recessed portion 35*c*. The embedding material main body 16*a* is made of comparatively soft metal such as iron, copper, brass or aluminum. The buckling member 16*b* is made of a soft metal material which can be buckled and mainly contains soft iron, lead, copper, zinc, aluminum or tin or one kind or plural kinds of them.

Since the use objects and the embedding method and the prevention of slipping-off of the embedding material 16 of the third embodiment are the approximately same as the case of the embodiment 1, the description thereof is omitted. When the upper portion of the embedding material 16 is made of hard metal, particularly, the same metal material as that of the screw head 35*b*, It appears that the embedded portion of the embedding material 16 is integral with the screw head 35*b*. For this reason, the appearance is good and even if the embedding material 16 is tried to be forcibly broken by an end portion of a driver, it cannot be broken. As a result, the case that the crime prevention screw 35 is drawn out can be prevented more efficiently.

It is desirable that the embedding material 16 is combined with the corresponding screw 35 to be sold as a crime prevention screw set G3.

There will be explained below a crime prevention screw according to a fourth embodiment of the present invention and an embedding material of a screw head of another embodiment corresponding to this screw with reference to FIGS. 11, 12(*a*) and 12(*b*).

As shown in FIGS. 11 and 12(*a*), the crime prevention screw 36 according to the fourth embodiment of the present invention (hereinafter, the crime prevention screw of the fourth embodiment) has a form such that the outer peripheral end of the screw head (33*b*) of the crime prevention screw

(33) of the first embodiment shown in FIG. 5 is cut roundly. The other portions are the same as those of the crime prevention screw (33) of the first embodiment, and 36c denotes a recessed portion and 36f denotes an engagement portion.

In addition, the embedding material 14 of a screw head 36b corresponding to the crime prevention screw 36 of the fourth embodiment which is the same as the embedding material (14) of the first embodiment is used and also in this embodiment it is desirable that the crime prevention screw 36 and the embedding material 14 are sold as a crime prevention screw set G4.

Since their using method is the approximately same as that in the above explanation, the description of the method is omitted. The crime prevention screw 36 of the fourth embodiment, as mentioned above, has the screw head 36b with round outer peripheral end and has a doughnut shape (viewed from top). It is more desirable that the crime prevention screw 36 is combined with a screw-use crime prevention seat 40, which is formed with a rise portion 40a having roundness which surrounds a side wall of the screw and is hardly pinched by a tool such as pincers or pliers, so as to be sold as a crime prevention screw set G5.

When the screw-use crime prevention seat 40 is used, the screw head 36b is housed in the rise portion 40a of the screw-use crime prevention seat 40 so as not to be pinched by the tool such as pincers or pliers. Further, even if the crime prevention seat 40 is tried to be pinched and rotated by using such tools, it cannot be pinched due to slipping. Moreover, even if the crime prevention seat 40 is forcibly pinched and rotated, only the crime prevention seat 40 is rotated idle. For this reason, the screw cannot be drawn out mockingly or with the intention of crime.

There will be explained below a crime prevention screw according to a fifth embodiment of the present invention and an embedding material of the fourth embodiment corresponding to this crime prevention screw with reference to FIGS. 13, 14(a) and 14(b).

As shown in FIGS. 13 and 14(a), when a crime prevention screw 37 is compared with the aforementioned crime prevention screw 36 of the fourth embodiment, a structure of an engagement portion 37f of a recessed portion 37c is different. The recessed portion 37c formed on the screw head 37b of the crime prevention screw 37 of the fifth embodiment is formed by a hexagon socket, and the recessed engagement portion 37f in which its inside is wider than its entrance is formed on a bottom 37e.

An embedding material 17 of the screw head of the fourth embodiment corresponding to the crime prevention screw 37 (hereinafter, the embedding material of the fourth embodiment) has a shape and a size such that it can embed in the recessed portion 37c. The embedding material 17 is composed of two members: an embedding material main body 17a formed with a recessed engagement portion 17c having a shape such that its inside is wider than its entrance at an end surface of the embedding material 17; and a connecting member 17b made of a soft metal material which is buckled in both the recessed portion 17c and the engagement portion 37f of the crime prevention screw 37 and fixes the embedding material main body 17a into the recessed portion 37c of the crime prevention screw 37.

As for the using method of the embedding material 17, one end of the connecting member 17b is pushed into one of the engagement portions 37f, 17c and the other end of the connecting member 17b is pushed into the other engagement portion so that the embedding material main body 17a is put into the recessed portion 37c. The upper end of the embedding material main body 17a which is projected upward from the recessed portion 37c is tapped by a hammer or the like and the connecting member 17b is buckled in both the engagement portions 37f, 17c so as not to come off.

With such a structure, similarly to the above-mentioned embodiments, the embedding material 17 (substantially the embedding material main body 17a) is embedded in the recessed portion 37c of the screw head 37b so that the embedding material 17 cannot be drawn out.

It is desirable that the embedding material 17 is also combined with the corresponding crime prevention screw 37 and the above-mentioned screw-use crime prevention seat 40 so as to be sold as a crime prevention screw set G6.

There will be explained below an embedding material of a screw head according to a fifth embodiment of the present invention with reference to FIGS. 15, 16(a) and 16(b).

The embedding material 18 of a screw head according to the fifth embodiment of the present invention corresponds to the crime prevention screws of the above embodiments other than the crime prevention screw of the fourth embodiment. In FIGS. 15, 16(a) and 16(b), the crime prevention screw is shown as the crime prevention screw 35 of the third embodiment.

As shown in FIGS. 15 and 16(a), the embedding material of a screw head according to the fifth embodiment of the present invention (hereinafter, the embedding material of the fifth embodiment) is a material for embedding in the recessed portion 35c composed of the hexagon socket formed on the screw head 35b of the crime prevention screw 35. The embedding material 18 is formed by resin so that an upper surface portion 18a having a shape for covering the recessed portion 35c is integral with standing portions 18b having the approximately same shape as both the inner side walls of the recessed portion 35c. Protrusions 18c are formed on end portions of the outer walls of the standing portions 18b, and a force which outwardly repulses pressurizing forces to the inner directions (approaching directions) is applied to the standing portions 18b.

As for the using method of the embedding material 18, as shown in FIGS. 16(a) to 16(b), the embedding material 18 may be simply pressurized into the recessed portion 35c formed on the screw head 35b with the side on which the protrusions 18c are formed faces towards the recessed portion 35c.

In such a manner, the embedding material 18 embeds in and cover the recessed portion 35c, and the protrusions 18c with the applied force go into a space as the engagement portion 35f in the recessed portion 35c so that the embedding material 18 cannot be come out of the recessed portion 35c.

It is desirable that the embedding material 18 is also combined with the corresponding crime prevention screw 35 so as to be sold as a crime prevention screw set G7.

Figure 17:
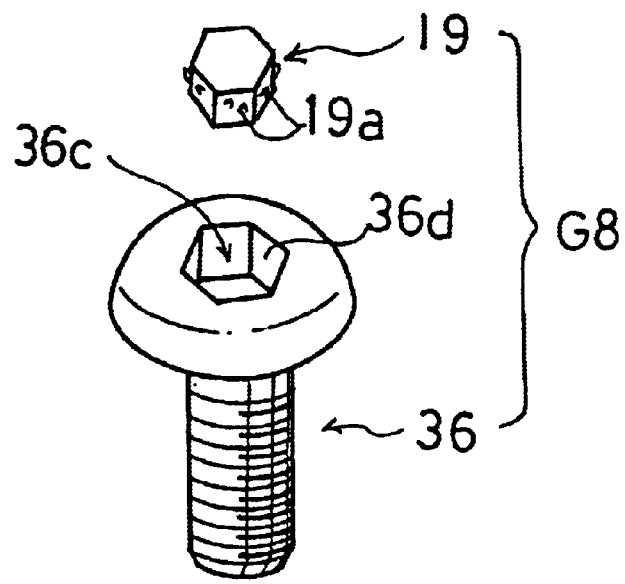
FIG. 17 is a perspective view showing a crime prevention screw having a hexagonal screw head and a corresponding embedding material according to a sixth embodiment.
Figure 18A:
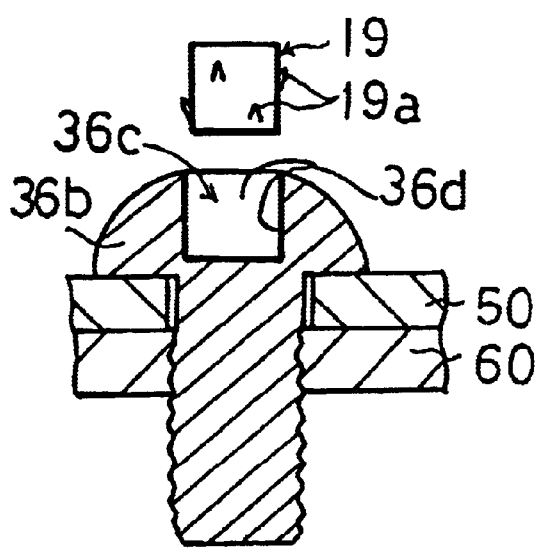
FIG. 18(a) is a front cross sectional view showing the first step of a using method of the crime prevention screw and the embedding material.

There will be explained below an embedding material of a screw head according to a sixth embodiment of the present invention with reference to FIGS. 17, 18(a) and 18(b).

An embedding material 19 of a screw head according to the sixth embodiment of the present invention (hereinafter, the embedding material of the sixth embodiment) can correspond to not only the crime prevention screws of the above embodiments but also screws conventionally in the market. For this reason, in FIGS. 17, 18(a) and 18(b), the embedding material 19 corresponds to the screw of the conventional art that the hexagonal recessed portion 36c is formed on the screw head 36b.

The embedding material 19 is formed by a soft metal material such as iron, copper, stainless, aluminum or tin having a size for embedding in the recessed portion 36c formed on the screw head 36b. Small rags 19a having an acute angle which are slanted and raised from the embedding direction to the opposite direction are formed on the side walls of the embedding material 19.

Figure 18B:
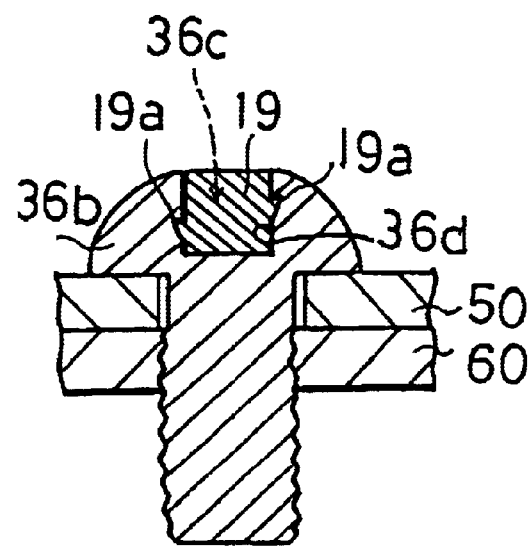
FIG. 18(b) is a front cross sectional view showing the final step of the using method of the crime prevention screw and the embedding material.

When the embedding material 19 is formed in such a manner, as shown in FIG. 18(b), the embedding material 19 is embedded in the recessed portion 36c by pressurizing the embedding material 19 thereinto through tapping via a hammer or the like. Further, the rags 19a come deeply into the side wall 36d of the recessed portion 36c so that the embedding material 19 does not come off.

It is desirable that the embedding material 19 is also combined with the corresponding screw 36 so as to be sold as a crime prevention screw set G8.

The above-mentioned embodiments explained mainly about the screws that their recessed portion formed on their screw heads are hexagonal and about the corresponding embedding materials. However, in the respective embodiments, screws that their recessed portions having another shapes, such as a square shape, a cross shape and a slot shape, and corresponding embedding materials may be used.

When the crime prevention screws, the embedding materials of screw heads and the screw-use crime prevention seats according to the present invention are used together, the embedding materials can be embedded in the recessed portions formed on the screw heads so as not to come off after the screws are tightened. For this reason, the drawing-out of the screws mockingly or with the intention of crime can be prevented. Concretely, the present invention shows effects such that crimes, such as car stealing through removal of a number plate of an automobile by drawing out the screws, resale and export of stolen automobiles, stealing and kidnapping using a stolen car, stealing of a car stereo and a car navigation device in an automobile, can be prevented.

In addition, the present invention shows an effect such that a criminal is previously prevented from drawing out screws for fixing an outer grid of a window and a key of a door in a house and from intruding through the window or the door into the house and from committing stealing and bestial crime.

What is claimed is:

1. A crime prevention screw wherein a recessed portion which is composed of a square socket, a hexagon socket, a cross socket or a slot for engaging and rotating an end portion of a tool such as a square bar spanner or a driver is formed on a screw head, and a recessed engagement portion is formed on a partial place of an inner wall of the recessed portion such that one of an expanded portion formed by buckling a part of an embedding material for embedding in the recessed portion and a protrusion to which a force is applied to the side of the embedding material for embedding in the recessed portion comes into the engagement portion, whereby the embedding material is prevented from coming off.

2. The crime prevention screw according to claim 1, wherein said crime prevention screw is one selected from a machine screw, a set screw, a square screw, an embedded screw, a bolt or a wood screw.

3. An embedding material of said crime prevention screw of claim 2, wherein said embedding material is a material for embedding in the recessed portion, for pushing a tool thereinto, composed of a square socket, a hexagon socket, a cross socket or a slot and has a shape and a size such that it can embed in the recessed portion through tapping or pressurizing-into and a suitable portion of its side wall is formed with rags or burrs for preventing said embedding material from coming off.

4. A screw-use crime prevention seat having a doughnut shape viewed from top, said seat being fitted into the screw main body of said crime prevention screw according to claim 2 and being received by the screw head, wherein a rise portion having roundness, which surrounds the side wall of the screw head and is hardly nipped by a tool such as pincers or pliers, is formed around said seat.

5. The crime prevention screw according to claim 1, wherein the screw head of said crime prevention screw is formed into a curved surface shape which is hardly pinched by a pinching tool such as pincers.

6. An embedding material of a screw head for embedding in the recessed portion for pushing a tool thereinto, composed of a square socket, a hexagon socket, a cross socket or a slot, the recessed portion being formed on the screw head of said crime prevention screw according to claim 1, wherein said embedding material has a shape and a size such that it can buckled in and can embed in the recessed portion and at least an end portion of said embedding material is made of a soft metal material which can be buckled and mainly contains soft iron, lead, copper, zinc, aluminum or tin, or a combination of two or more of these materials.

7. The embedding material of a screw head according to claim 6, wherein said embedding material has a shape and a size such that it can be buckled in and can embed in the recessed portion for pushing a tool thereinto, which is formed on the screw head of the crime prevention screw and is composed of a square socket, a hexagonal socket, a cross rocket and a slot, and is composed of two members: an embedding material main body which is formed with a recessed engagement portion having a shape such that an inside is wider than an entrance at its end surface; and a connecting member which is buckled in both this engagement portion and the recessed engagement portion formed on the bottom portion of said crime prevention screw that its inside is wider than its entrance so as to fix the embedding material main body in the recessed portion of said crime prevention screw and is made of soft metal material mainly containing soft iron, lead, copper, zinc, aluminum or tin, or a combination of two or more of these materials.

8. An embedding material of a screw head, for embedding in the recessed portion for pushing a tool thereinto, composed of a square socket, a hexagon socket, a cross socket or a slot, said recessed portion being formed on the screw head of said crime prevention screw according to claim 1, wherein said embedding material has a shape and a size such that it can embed in the recessed portion and an end of portion of said embedding material is formed with a protrusion which comes into the engagement portion of the screw when a force is applied to the protrusion.

9. An embedding material of said crime prevention screw of claim 1, wherein said embedding material is a material for embedding in the recessed portion, for pushing a tool thereinto, composed of a square socket, a hexagon socket, a cross socket or a slot and has a shape and a size such that it can embed in the recessed portion through tapping or pressurizing-into and a suitable portion of its side wall is formed with rags or burrs for preventing said embedding material from coming off.

10. A screw-use crime prevention seat having a doughnut shape viewed from top, said seat being fitted into the screw main body of said crime prevention screw according to claim 1 and being received by the screw head, wherein a rise portion having roundness, which surrounds the side wall of the screw head and is hardly nipped by a tool such as pincers or pliers, is formed around said seat.

11. A crime prevention screw, wherein a recessed portion which is composed of a square socket, a hexagon socket, a cross socket or a slot for engaging and rotating an end portion of a tool such as a square bar spanner or a driver is formed on a screw head, and a recessed engagement portion where its inside is wider than an entrance is formed on a bottom portion of the recessed portion such that one of a protrusion formed at an end of an embedding material for embedding in the recessed portion and one end portion of a connecting member for connecting the embedding material to the screw head comes into the engagement portion, whereby the embedding material is prevented from coming off.

12. The crime prevention screw according to claim 11, wherein said crime prevention screw is one selected from a machine screw, a set screw, a square screw, an embedded screw, a bolt or a wood screw.

13. An embedding material of said crime prevention screw of claim 12, wherein said embedding material is a material for embedding in the recessed portion, for pushing a tool thereinto, composed of a square socket, a hexagon socket, a cross socket or a slot and has a shape and a size such that it can embed in the recessed portion through tapping or pressurizing-into and a suitable portion of its side wall is formed with rags or burrs for preventing said material from coming off.

14. A screw-use crime prevention seat having a doughnut shape viewed from top, said seat being fitted into the screw main body of said crime prevention screw according to claim 12 and being received by the screw head, wherein a rise portion having roundness, which surround the side wall of the screw head and is hardly nipped by a tool such as pincers or pliers, is formed around said seat.

15. The crime prevention screw according to claim 11 wherein the screw head of said crime prevention screw is formed into a curved surface shape which is hardly pinched by a pinching tool such as pincers.

16. An embedding material of a screw head for embedding in the recessed portion for pushing a tool thereinto, composed of a square socket, a hexagon socket, a cross socket or a slot, the recessed portion being formed on the screw head of said crime prevention screw according to claim 11, wherein said embedding material has a shape and a size such that it can be buckled in and can embed in the recessed portion and at least an end portion of said embedding material is made of a soft metal material which can be buckled and mainly contains soft iron, lead, copper, zinc, aluminum or tin, or a combination of two or more of these materials.

17. An embedding material of a screw head, for embedding in the recessed portion for pushing a tool thereinto, composed of a square socket, a hexagon socket, a cross socket or a slot, said recessed portion being formed on the screw head of said crime prevention screw according to claim 11, wherein said embedding material has a shape and a size such that it can embed in the recessed portion and an end portion of said embedding material is formed with a protrusion which comes into the engagement portion of the screw when a force is applied to the protrusion.

18. An embedding material of said crime prevention screw of claim 11, wherein said embedding material is a material for embedding in the recessed portion, for pushing a tool thereinto, composed of a square socket, a hexagon socket, a cross socket or a slot and has a shape and a size such that it can embed in the recessed portion through tapping or pressurizing-into and a suitable portion of its side wall is formed with rags or burrs for preventing said embedding material from coming off.

19. A screw-use crime prevention seat having a doughnut shape viewed from top, said seat being fitted into the screw main body of said crime prevention screw according to claim 11 and being received by the screw head, wherein a rise portion having roundness, which surrounds the side wall of the screw head and is hardly nipped by a tool such as pincers or pliers, is formed around said seat.

* * * * *